2,966,653

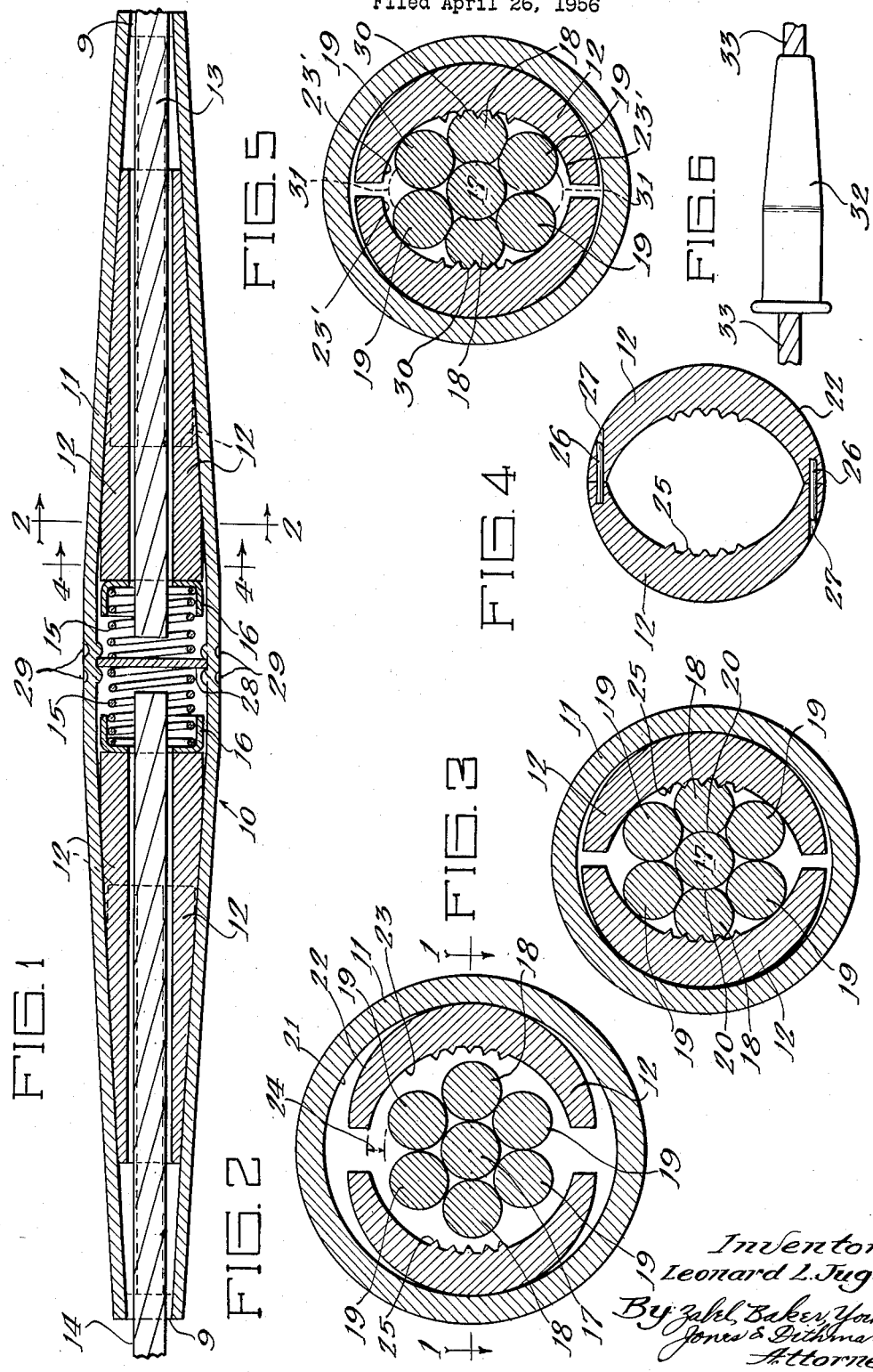

WIRE GRIPPING DEVICE FOR ACSR CABLES

Leonard L. Jugle, Elmhurst, Ill., assignor to Reliable Electric Company, Chicago, Ill., a corporation of Illinois Filed Apr. 26, 1956, Ser. No. 580,786

6 Claims. (Cl. 339—95)

This invention relates to improvements in wire gripping devices of the jaw type which are used in connection with cable splices and dead ends.

It is an object of the present invention to provide a cable gripping device which is particularly suited for operation with ACSR cables, and the invention will be described with reference to a seven strand cable.

ACSR cable comprises a steel core strand and six aluminum strands surrounding the same in a spiral or helical lay. The steel core provides tensile strength for the cable compensating for the low tensile strength of aluminum wire. Approximately half of the tensile strength is supplied by the steel core with the result that the aluminum strands each supply about $\frac{1}{12}$ of the total. Therefore, in providing a cable gripping device it is necessary that the steel core be securely gripped.

Heretofore, the gripping devices provided have been composite devices in the sense that a separate gripping device has been provided for the steel core, and a second gripping device has been provided for the cable as a whole, the latter serving to grip the aluminum strands primarily. The installation of this composite or two-stage type of wire gripping device is time consuming since it requires that the steel core be bared, which means that the six aluminum strands must each be severed several inches from the end of the cable. Since installation is oftentimes effected when the wire is hot, or energized, and since this involves manipulation of the cable with hot line tools it can readily be understood that installation of a splice or dead end can be a very difficult and time consuming operation. Furthermore, in the case of dead ends of the compression sleeve type, it is necessary to completely install the fixture before the same is tested for length, and if the lineman has underestimated or over-estimated the position of the fixture, the position of the dead end cannot be shifted, but a second dead end must be applied at the proper position.

It is another object of the present invention to overcome the foregoing difficulties by providing a jaw type of cable gripping device which does not require baring of the steel core.

According to the present invention I provide means for gripping the cable in such a manner that the steel core is gripped by the aluminum conductor with a force sufficient to take up the load imposed on the steel core. More particularly, I provide a jaw construction which grips the cable with sufficient force that the aluminum conductor will be deformed at the line of contact with the harder steel core in order to provide a substantial area of contact between the aluminum and the steel. I have found that this can be accomplished by the use of two jaws, the gripping surfaces of which are shaped in a certain manner.

Still another object of the invention is to provide a two jaw wire gripping device of the type described embodying improved means by which the jaws may be associated with each other for permitting gripping movement, and for preventing relative axial movement.

A still further object is to provide an improved jaw construction in which the entire length of the jaw is available for gripping action.

Other objects, features and advantages will become apparent as the description proceeds.

With reference now to the drawings in which like reference numerals designate like parts:

Fig. 1 is a sectional plan view of a line splice embodying the invention, taken along line 1 of Fig. 2 and the jaws being shown in relaxed position for the purposes of illustration.

Fig. 2 is a section taken along line 2 of Fig. 1;

Fig. 3 is a section similar to Fig. 2, but showing the jaws in gripping position;

Fig. 4 is a section taken along line 4 of Fig. 1, but showing the jaws alone and in a fully collapsed position;

Fig. 5 is a section similar to that of Fig. 3 but showing a modified form of the invention; and, Fig. 6 shows a dead end cartridge embodying the invention.

With reference now to Figs. 1 and 2 in which the invention is shown as applied to a line splice 10, the gripping device comprises a tapered shell 11 and a pair of tapered jaws 12. In the case of a line splice, the jaws 12 and other parts are duplicated at each end, and the shell 11 is common to both.

The shell 11 of the line splice is provided with openings 9 at each end to receive cables 13 and 14 which are to be joined to each other. A barrier disk 28 is held in place by extrustion 29 formed in the shell wall.

A spring 15 is located between the inner end of the jaws 12 and the barrier disk 28, and urges the jaws outwardly and into gripping engagement with the cables 13 and 14. Suitable apertured cups 16 are provided to confine the end convolutions of the spring and to serve as force distributing washers.

In operation, a cable 13 is inserted into the opening 9 and the cable engages the ends of the jaws 12 and urges them inwardly against the bias of spring 15, which causes the jaws 12 to spread until a cable can be received between the jaws and extended into the central region which is occupied by the spring 15. After the completion of the inserting operation, the spring urges the jaws 12 outwardly toward the opening 9 and the taper of the jaws and shell urges the jaws into gripping engagement with the cable. Tension subsequently applied to the cable increases the gripping action.

With reference now to Figs. 2 and 3, the cable 13 comprises a steel core strand 17 and six aluminum strands which helically surround the same, those two which occupy the zero and 180° positions at any particular point along the longitudinal axis of the cable and jaws being specifically identified as the median strands 18 with respect to that point and the remaining four strands by the reference numeral 19. Since, with respect to a continuous inner surface element of the jaws which is parallel to the cable axis and located at the said zero and 180° positions of the jaws there will be median strands only at certain points, those points can be referred to as the nodal points.

The jaws are so designed as to exert a compressive force primarily on the median strands, so that they will be urged against the steel core 17 and deformed as at 20, thus providing a substantial area of contact between the median strands 18 and the steel core 17.

The inner surface of the shell 11 is a conical surface 21, the radius of which varies from point to point as indicated by a comparison of Figs. 2 and 3. The outer surface of each jaw 12 is also a conical surface 22, having the same degree of taper as the conical surface 21. When the jaws are totally collapsed, as shown in Fig. 4, the surfaces 22 and 21 are coincident or in full surface contact, one with the other, this position being approximately the dotted line positions of the jaws shown in Fig. 1. However, as the jaws are displaced inwardly, the contact between the surfaces 21 and 22 become a line contact and the radius of the jaw surface 22 is substantially less than the radius of the shell surface 21 as shown in Fig. 2.

The inner surface of each jaw 12 is substantially a cylindrical surface 23, having a radius materially greater than the maximum radius of the cable 13. The difference between the two radii is indicated by the dimension line 24 in Fig. 2, for purposes of illustration.

As a result of the difference in radius between the inner jaw surface 23 and the cable 13, when the parts are in gripping relationship as shown in Fig. 3, the pressure of the jaws will be applied primarily to the median strands 18 and not to the remaining strands 19.

In other words, as the jaws move toward each other, the inner surfaces 23 define a generally elliptically shaped opening, the width of which is greater than the cable diameter and the height of which is less than the cable diameter. By shaping the jaws in this manner, the gripping force is concentrated on less than all of the aluminum strands with the result that a greater degree of deformation can be obtained than if the force were equally distributed among all six of the aluminum strands.

The maximum deformation occurs at those points along the length of the jaws where two strands occupy the median positions as shown in Figs. 2 and 3, which points are referred to as the nodal points. It is contemplated that the length of the jaws 12 be at least equal to one full helical lay of the cable with the result that the maximum gripping action exerted on the core 17 will be provided at each nodal point or at a total of at least six points along the length of the jaws.

The inner jaw faces 23 are desirably provided with teeth 25 which enhance the gripping action, and which also penetrate the oxide coating of the aluminum strands to make good electrical contact between the cable and the jaw.

The jaws are associated with each other at their larger ends by means of pins 26, as shown in Fig. 4, to prevent relative axial movement. One pin 26, is secured in one jaw and its free end is slidably received within a bore 27 formed in the other jaw. The use of only two jaws thus permits elimination of the usual jaw positioning washer of the type shown in Jugle Patent No. 2,288,138 granted June 30, 1942. Furthermore, the elimination of a jaw positioning washer permits the gripping surface to be extended for the full length of the jaw as contrasted with the arrangement shown in the above patent.

A modified jaw shape is shown in Fig. 5 in which the inner jaw surface 23' is not cylindrical. For instance, the jaw surface may be slabbed, as at point 30, and the remaining portion may be of generally elliptical section.

Where a cylindrical surface 23 is employed, it has been found that the differential 24 may desirably be from 15 to 25% of the cable radius. However, irrespective of the exact shape of the surface 23 or 23', the total width of the elliptical opening should be greater than the cable diameter so as to avoid any pinching of the cable which might impede free movement of the jaws. For instance, in Fig. 5 the dotted lines 31 indicate the location of the strands at a different point in the lay and it will be apparent that some clearance is necessary between the dotted line 31 and the corner edges of the jaw surfaces 23'.

It will be understood that the open position of the jaws shown in Figs. 1 and 2 are extreme positions which are shown for the purpose of illustration, but which may not be encountered in actual practice. During the insertion of the cable, there will always be contact between at least one of the teeth 25, not shown in Fig. 1, on each jaw and the surface of the cable 13. However, the cylindrical shape of the inner jaw surface 23 and the radius differential 24 are more easily comprehended by showing the parts in the positions illustrated in Figs. 1 and 2.

To summarize the operation, after insertion of the cable 13, the two jaws 12 are urged into gripping relationship as shown in Fig. 3 by the spring 15. Normal tension subsequently applied to the cable will cause the jaws to move into substantially the dotted line position shown in Fig. 1 and in this position the cable 13 as a whole is substantially flattened due to the deformation of the median strands 18. This deformation causes the steel core 17 to be gripped throughout a substantial area of contact with the result that the tensile stress of the cable is transmitted from the steel core 17 to the jaws 12 and shell 13 by the compressive stress of the median strands 18. Thus, the steel core 17 is securely gripped without the provision of a separate gripping device, or without the provision of a gripping device which provides a separate gripping stage for engaging the steel core directly.

The present invention is equally applicable to dead end cartridges, and is of particular utility as applied to a feed-through type of dead end cartridge 32, illustrated in Fig. 6. In this type of wire-gripping device, a suitable yoke is provided for holding the cartridge 32, thus permitting the cable 33 to be supported at one end of its span. In the feed-through type of dead end shown in Fig. 6, the cable 33 passes entirely through the cartridge so that electrical connections can be made on the slack or fed-through portion of the cable.

In the case of the previously mentioned two-stage type of wire gripping device of the prior art, it is, of course, not possible to feed through the entire cable, whereas the present invention avoids this difficulty.

Furthermore, at the time of installation, adjustments in the position of a dead end embodying the present invention can be effected, as contrasted with the previously mentioned disadvantages which are inherent in dead ends of compression sleeve type.

Reference is hereby made to the aforementioned Patent No. 2,288,138 which illustrates the general arrangement of the parts of a dead end cartridge in greater detail.

Although only preferred embodiments of this invention have been shown and described herein, it will be understood that various modifications and changes may be made in the construction shown without departing from the spirit of this invention as pointed out in the appended claims.

I claim:

1. Means for gripping the relatively hard steel core of ACSR cable, said means comprising the aluminum strands of said cable which surround in helical lay the relatively hard steel core thereof, in combination with a wire gripping device which includes a tapered shell surrounding said aluminum strands and having a substantially conical inner surface, and two jaws disposed therein having substantially half-conical outer surfaces and having cylindrical inner surfaces of a radius substantially greater than the radius of said cable to be gripped, and extending through substantially less than 180 degrees of arc to provide, when juxtaposed, an opening of a generally elliptical shape whereof the dimension along the major axis is greater than the diameter of the cable to be gripped, and the dimension along the minor axis is less than said diameter whereby contraction of said jaws will cause compression and deformation of all of said strands at those portions of oppositely disposed pairs of strands which occupy the median position between said jaws so that each of said median position portions will be deformed around said relatively hard steel core to provide a gripping engagement of said core, said outer surface and said inner surface of said jaw being non-concentric with each other.

2. Means for gripping a cable, said cable comprising a relatively hard core strand and a plurality of relatively soft external strands surrounding said core strand in helical lay, said means including said relatively soft external strands, in combination with a wire gripping device which includes a tapered shell surrounding said external strands having a conical inner surface, and two jaws disposed therein having half-conical outer surfaces and having concave inner surfaces cooperating when juxtaposed to provide an opening of a generally elliptical shape whereof the dimension along the major axis is greater than the diameter of the cable to be gripped, and the dimension along the minor axis is less than said diameter whereby contraction of said jaws will cause compression and deformation of said strands at those portions of oppositely disposed pairs of strands which occupy the median position between said jaws so that each of said median position portions will be deformed around the said relatively hard core strand to provide a gripping engagement of said core strand, of a force sufficient to take up the load imposed on said core strand, the average radius of the concave inner surface of each jaw being greater than that radius which would be required to produce substantial concentricity of said inner jaw surface with respect to said outer jaw surface.

3. Means for gripping a cable comprising a relatively hard core strand and a plurality of relatively soft external strands surrounding said core strand in helical lay, said means including said relatively soft external strands, in combination with a wire gripping device which includes a shell having a tapered inner surface surrounding said external strands, two jaws disposed therein for cooperation with the inner surface thereof, said jaws having inner gripping surfaces shaped when contracted to provide an opening of a generally elliptical shape whereof the dimension along the major axis is greater than the diameter of the cable to be gripped, and the dimension along the minor axis is less than said diameter, whereby contraction of said jaws will cause compression and deformation of all of said strands at those portions of oppositely disposed pairs of strands which lie between said gripping surfaces so that each of said pairs of strands at said portions will be deformed around the said relatively hard core strand to provide a gripping engagement of said core strands, and means for preventing relative axial movement of one jaw with respect to the other, the radial thickness of said jaws being less at their side edges than at their central portions.

4. A wire gripping device for steel core aluminum stranded cable comprising a shell having a tapered inner surface, two half-conical jaws slidably disposed and completely contained therein for cooperation with the tapered inner surface of said shell, said jaws being provided with inner concave gripping surfaces transversely confined to substantially 60 degrees of arc and being longitudinally extended for the entire length of said jaws, teeth formed on said gripping surfaces, and two parallel pins connecting said jaws to each other for preventing relative axial movement of one with respect to the other, but permitting gripping movement of said jaws towards each other, said jaws when contracted providing an opening of a generally elliptical shape whereof the dimension along the major axis is greater than the diameter of the cable to be gripped, and the dimension along the minor axis is less than said diameter, the radial thickness of said jaws at the edges being less than the thickness at said gripping surfaces.

5. A wire gripping device for steel core aluminum stranded cable comprising a shell having a tapered inner surface, two half-conical jaws slidably disposed therein for cooperation with said tapered inner surface and each having one end larger than the other end, said jaws being provided with inner gripping surfaces transversely confined to substantially 60 degrees of arc and being longitudinally extended for the entire length of said jaws, and means connecting said jaws to each other for preventing relative axial movement of one with respect to the other, but permitting gripping movement of said jaws toward each other, said means comprising a plurality of pins, each pin being fixedly mounted in one of said jaws and projecting from an edge surface thereof, the free end of said pin being slidably received within a bore formed in the opposite edge surface of the other jaw, said pins being parallel to each other and being located at the larger ends of said jaws, said jaws when contracted providing an opening of a generally elliptical shape whereof the dimension along the major axis is greater than the diameter of the cable to be gripped, and the dimension along the minor axis is less than said diameter, the radial thickness of said jaws at the edges being less than the thickness at said gripping surfaces.

6. Means for gripping the steel core of ACSR cable, said means comprising a plurality of aluminum strands surrounding said core in helical lay and forming a part of the cable itself, a shell having a tapered inner surface and being open at the outer end thereof, and two jaws slidably disposed within said shell and provided with cable gripping surfaces, said surfaces being shaped so as to engage said strands at those portions thereof which occupy the median position between said jaws so that each of said median position portions will be deformed at the point of contact with said steel core to provide a gripping action thereon, said jaws when contracted providing an opening of a generally elliptical shape whereof the dimension along the major axis is greater than the diameter of the cable to be gripped, and the dimension along the minor axis is less than said diameter, the radial thickness of said jaws at the edges being less than the thickness at said gripping surfaces.

References Cited in the file of this patent

UNITED STATES PATENTS

| 831,548 | Fleeger | Sept. 25, 1906 |
| 1,986,735 | Mack | Jan. 1, 1935 |
| 2,166,458 | Berndt | July 18, 1939 |
| 2,177,364 | Fotsch | Oct. 24, 1939 |
| 2,180,866 | Cryer | Nov. 21, 1939 |
| 2,212,670 | Murray | Aug. 27, 1940 |
| 2,441,304 | West | May 11, 1948 |
| 2,526,661 | Hillery | Oct. 24, 1950 |

FOREIGN PATENTS

| 23,950 | Great Britain | 1912 |
| 27,563 | Great Britain | 1904 |